United States Patent [19]

Udagawa

[11] Patent Number: 5,576,762
[45] Date of Patent: Nov. 19, 1996

[54] SOLID-STATE IMAGE PICKUP DEVICE

[75] Inventor: Yoshiro Udagawa, Tokyo, Japan

[73] Assignee: Canon Kabushiki Kaisha, Tokyo, Japan

[21] Appl. No.: 393,883

[22] Filed: Feb. 22, 1995

Related U.S. Application Data

[63] Continuation-in-part of Ser. No. 87,112, Jul. 1, 1993, abandoned, which is a continuation of Ser. No. 788,287, Nov. 5, 1991, abandoned.

[30] Foreign Application Priority Data

Nov. 7, 1990 [JP] Japan ................................ 2-299930

[51] Int. Cl.$^6$ .................................................. H04N 5/335
[52] U.S. Cl. ............................................................. 348/296
[58] Field of Search ................................... 348/216, 208, 348/229, 294, 295, 296, 297, 311, 312; H04N 5/335

[56] References Cited

U.S. PATENT DOCUMENTS

| | | | |
|---|---|---|---|
| 4,835,617 | 5/1989 | Todaka et al. | 358/213.13 |
| 4,875,100 | 10/1989 | Yonemoto et al. | 358/213.19 |
| 4,984,002 | 1/1991 | Kokubo | 358/213.13 |
| 5,083,209 | 1/1992 | Inoue et al. | 358/228 |

FOREIGN PATENT DOCUMENTS

| | | | |
|---|---|---|---|
| 168076 | 3/1989 | Japan | H04N 5/335 |
| 1165272 | 6/1989 | Japan | H04N 5/335 |
| 1177780 | 7/1989 | Japan | H04N 5/335 |
| 2185173 | 7/1990 | Japan | H04N 5/335 |
| 389685 | 4/1991 | Japan | H04N 5/335 |

*Primary Examiner*—Wendy Garber
*Assistant Examiner*—Tuan V. Ho
*Attorney, Agent, or Firm*—Fitzpatrick, Cella, Harper & Scinto

[57] ABSTRACT

A solid-state image pickup device having solid-state image pickup elements for obtaining image signals by sequentially selecting horizontal pixel trains, the device including a reset pulse timing controlling circuit for controlling a reset pulse timing of a photosensitive element in accordance with the illuminance of a subject.

20 Claims, 4 Drawing Sheets

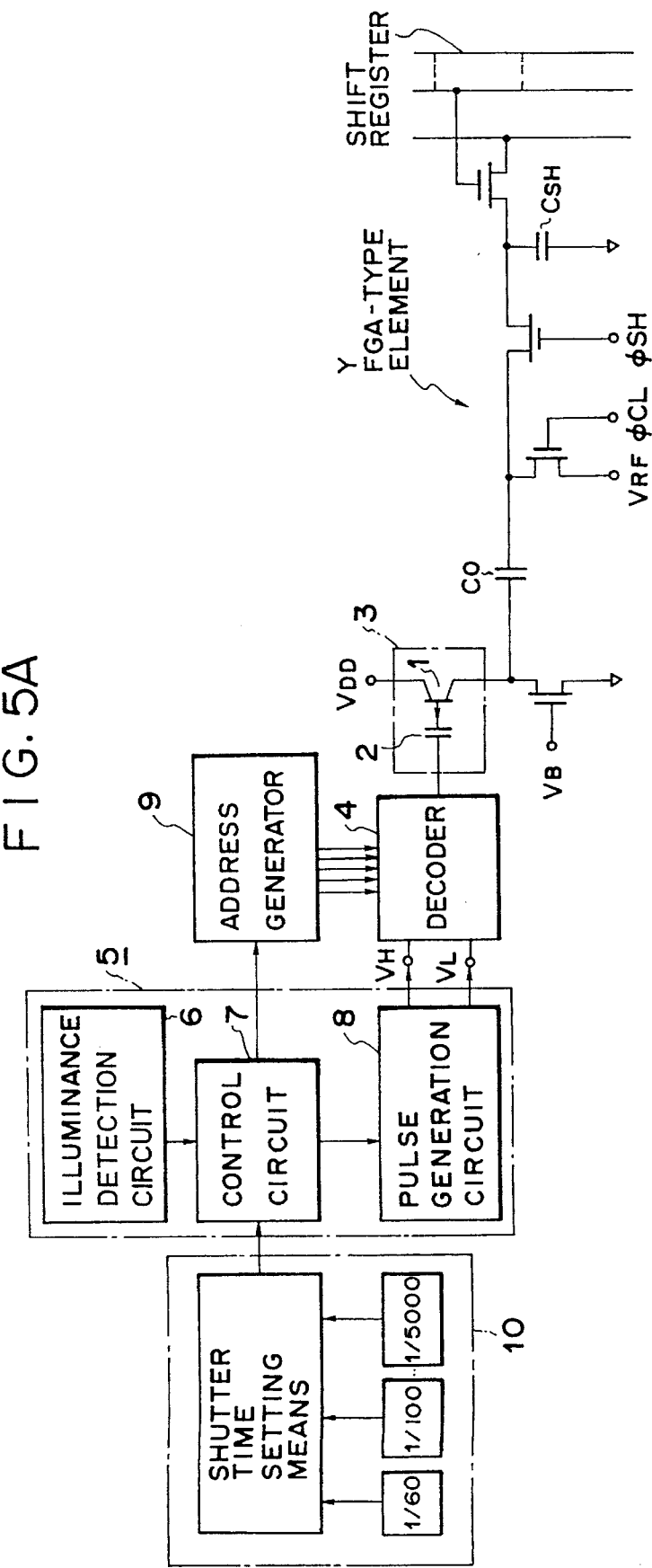
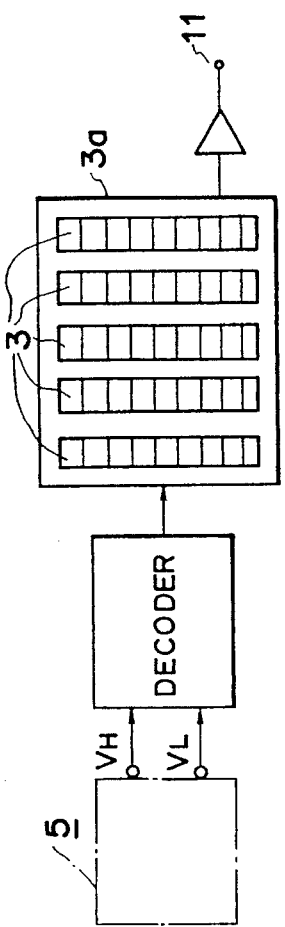
FIG. 5A
FIG. 5B

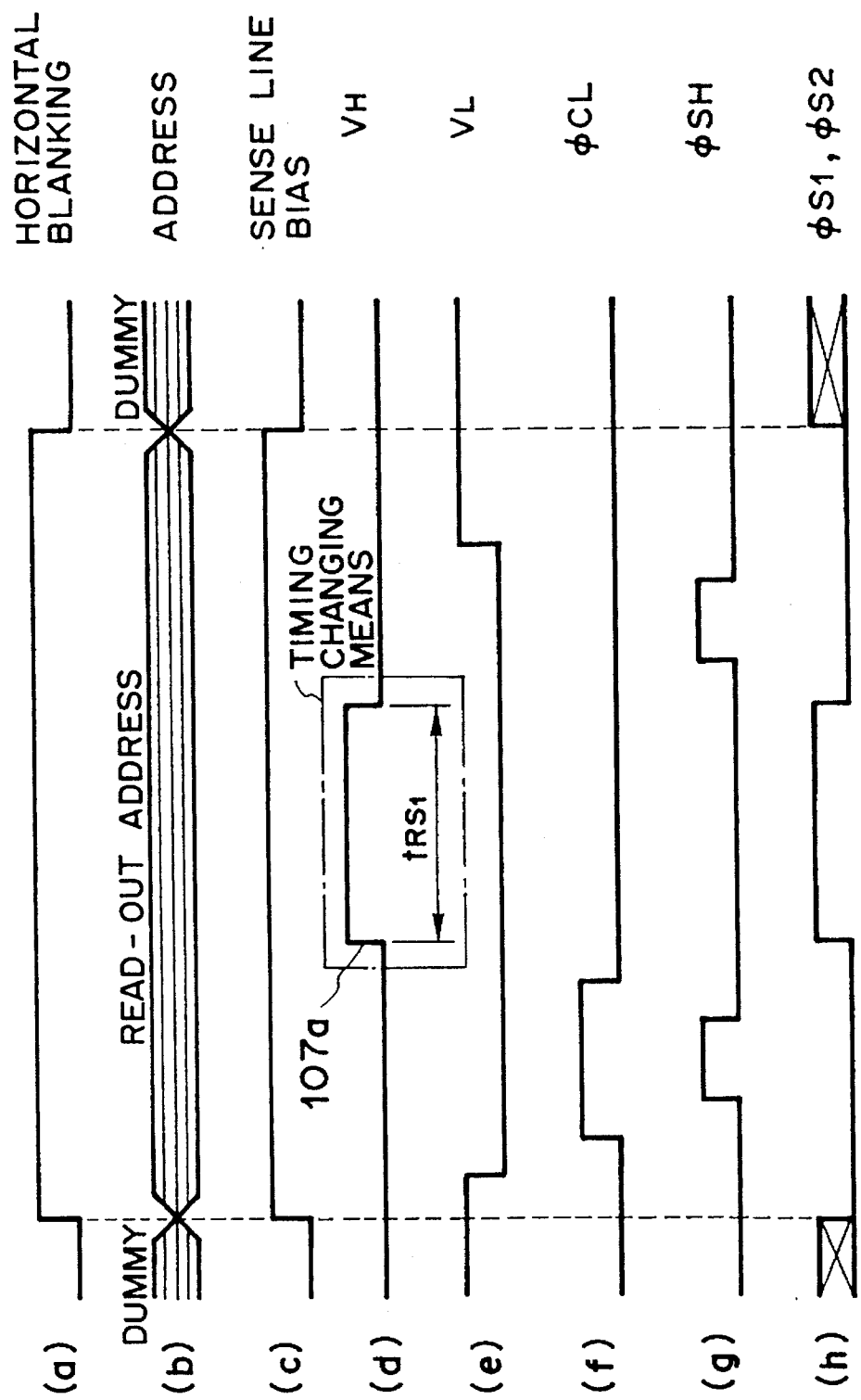

SOLID-STATE IMAGE PICKUP DEVICE

This application is a continuation of U.S. patent application Ser. No. 08/087,112, filed Jul. 1, 1993, now abandoned, which is a continuation of U.S. patent application Ser. No. 07/788,287, filed Nov. 5, 1991, now abandoned.

BACKGROUND OF THE INVENTION

1. Field of the Invention

The present invention relates to a solid-state image pickup device.

2. Related Background Art

There are known various image pickup elements of the type in which signals are obtained by sequentially selecting horizontal pixel trains. Recently, there has been proposed an amplification type image pickup element of this type called a floating-gate-array (FGA) type.

A conventional FGA amplification type image pickup element will be described with reference to FIGS. 1 to 3.

FIG. 1 shows the fundamental structure of an FGA amplification type image pickup element (hereinafter called an FGA type element), and FIG. 2 is a timing chart showing the operation of driving FGA type elements.

Referring to FIG. 1, a plurality of photosensitive pixels 3 each comprised by a J-FET 1 and a capacitor 2 are disposed two dimensionally to constitute a photosensitive area (not shown). A $V_H$ pulse is applied to one horizontal line selected by vertical address lines to thereby read data on the selected line. $V_L$ pulses are applied to the remaining horizontal lines. In FIG. 2, a horizontal blanking signal is shown at (a), an address signal is shown at (b), a sense line bias signal is shown at (c), a reset pulse $V_H$ is shown at (d), a pulse $V_L$ is shown at (e), a clamp pulse øCL is shown at (f), a sample hold pulse øSH is shown at (g), and the drive timings of øS$_1$ and øS$_2$ are shown at (h).

The operation of the conventional FGA type element will be described while mainly referring to FIG. 2.

At FIG. 2(a) 101 during the horizontal blanking period, a sense line bias signal turns on at (c) 102 to enter a read standby state. At the same time, a read selection address signal indicates at (b) 103 a selection line (ADR=k). $V_L$ pulses for other horizontal lines not selected turn off at (e) 104 so as not to pickup data on the other horizontal lines. Next, a clamp pulse øCL turns on at (f) 105, a sample hold pulse øSH turns on at (g) 106, and sample hold capacitor C$_{SH}$ (refer to FIG. 1) is reset. Then, the reset pulse turns on at (d) 107 to discharge electric charges. Thereafter, the sample hold pulse turns on again at (g) 108 while holding its value in C$_{SH}$. In order to conduct an electronic shutter operation, the address signal indicates another address line (ADR=L) at (b) 109. The electric charges on the selected line are discharged upon application of a reset pulse at (d) 110. After the horizontal blanking period at (a) 111, a shift register is driven at (h) 112 to read signals on one horizontal signal.

The electronic shutter speed control is performed depending upon the selection of address signals as shown in FIG. 4, i.e., upon a difference between the read address (l) and reset address (m).

In a video camera of an NTSC system using a conventional image pickup element having the above-described characteristics, the longest storage time period is generally 1/60 second. In such a case, driving methods shown in FIG. 3 have been used. Specifically, only address pulses among the pulses shown in FIG. 2 are changed to address pulses (2) as shown in FIG. 3. Immediately after reading data, the same pixel train is reset again.

Alternatively, only $V_H$ pulses are changed to $V_H$ (2) pulses. Only a reset operation for reading data is carried out, and a reset pulse for an electronic shutter is not generated.

Both the methods can set the storage time period to 1/60 second.

An electronic shutter performs an exposure control in combination with an exposure aperture. A shutter speed of 1/60 second is set mostly under a low illumination state among various light quantities.

It is well known that not only an FGA type element but also a phototransistor cell element has a problem of reset fluctuation. This reset fluctuation appears as fixed pattern noises (F.P.N) under a low illuminance state, thereby considerably degrading an image quality.

Recent various studies have shown that reset fluctuation depends on a reset time period, and that reset fluctuation is generally less for a longer reset time period.

However, the above-described reset timings are the same for any illumination state and therefore reset fluctuation has not been properly dealt with.

SUMMARY OF THE INVENTION

The present invention has been made in order to solve the above-described problem. It is therefore an object of the present invent&on to provide a solid-state image pickup device having no reset fluctuation under a low illumination state without using any hardware.

According to a preferred embodiment of the present invention, there is provided a solid-state image pickup device having solid-state image pickup elements for obtaining image signals by sequent&ally selecting horizontal pixel trains, the device comprising reset pulse timing controlling means for controlling a reset pulse timing of a photosensitive element in accordance with illuminance.

According to another embodiment of the present invention, the reset pulse timing controlling means changes the reset pulse timing of a photosensitive element only during a field time period, and increases the reset pulse width.

According to the first-mentioned embodiment of the solid-state image pickup device, the reset pulse timing controlling means controls a reset pulse timing of a photosensitive element in accordance with illuminance.

According to the second-mentioned embodiment of the solid-state image pickup device, the reset pulse timing controlling means changes the reset pulse timing of a photosensitive element only during a field time period, and increases the reset pulse width.

The other objects and advantages of the present invention will become more apparent from the following detailed description of the embodiment when read in conjunction with the accompanying drawings.

BRIEF DESCRIPTION OF THE DRAWINGS

FIGS. 5A and 5B are circuit diagrams showing the structure of an embodiment according to the present invention; and FIG. 6 is a timing chart for driving FGA type elements according to an embodiment of the present invention.

DESCRIPTION OF THE PREFERRED EMBODIMENTS

A preferred embodiment of the present invention will be described in detail with reference to FIGS. 5A, 5B, and 6.

Figure 1:
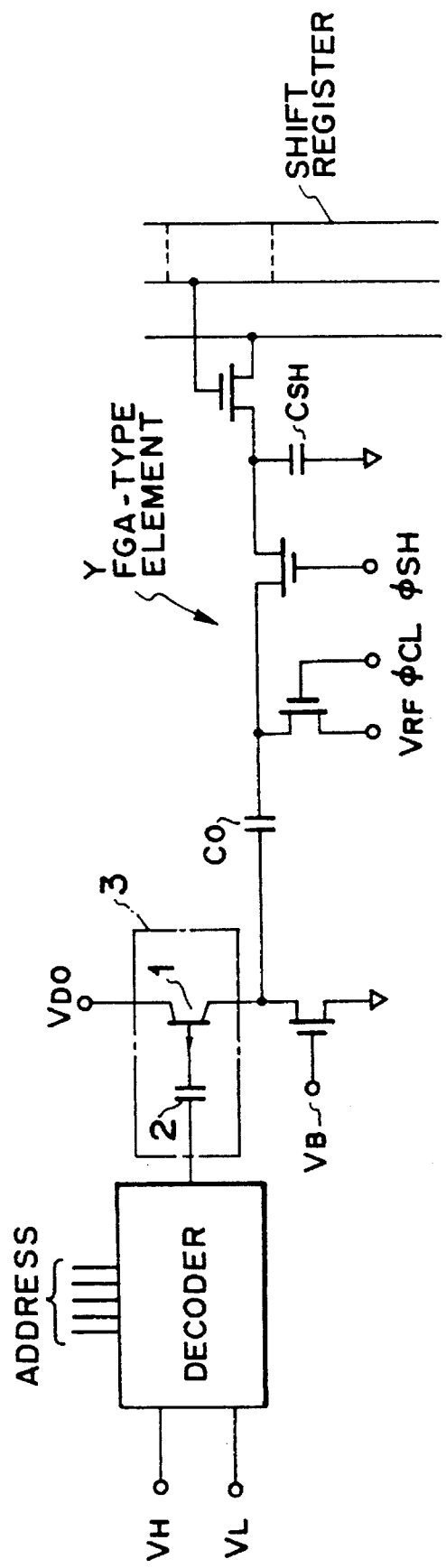
FIG. 1 shows the fundamental structure of a conventional FGA type element.

Like elements to those shown in FIG. 1 are represented by using identical reference numerals, and the description thereof is omitted.

FIG. 5A is a circuit diagram showing the structure of the present embodiment. A plurality of photosensitive pixels 3 are disposed in a matrix configuration on a light receiving surface 3a of the image pickup device as shown in FIG. 5B.

Read pulses and reset pulses are supplied via a decoder 4 to the photosensitive pixels 3.

Reset pulse timing controlling means (hereinafter called timing controlling means) 5 for controlling the pulse width of the reset pulse, supplies pulses $V_H$ and $V_L$ such as shown in FIG. 6 at (d) and (e) to the decoder 4.

The timing controlling means 5 of the present embodiment comprises an illuminance detection circuit 6 for detecting the brightness of a subject by using a Silicon Photo Cell (SPC) or the like, a control circuit 7 for generating a control signal in response to a signal detected by the detection circuit 6, and a pulse generation circuit 8 for generating the pulse $V_H$ while variably setting its width $T_{RS1}$ in accordance with the control signal.

Figure 2:
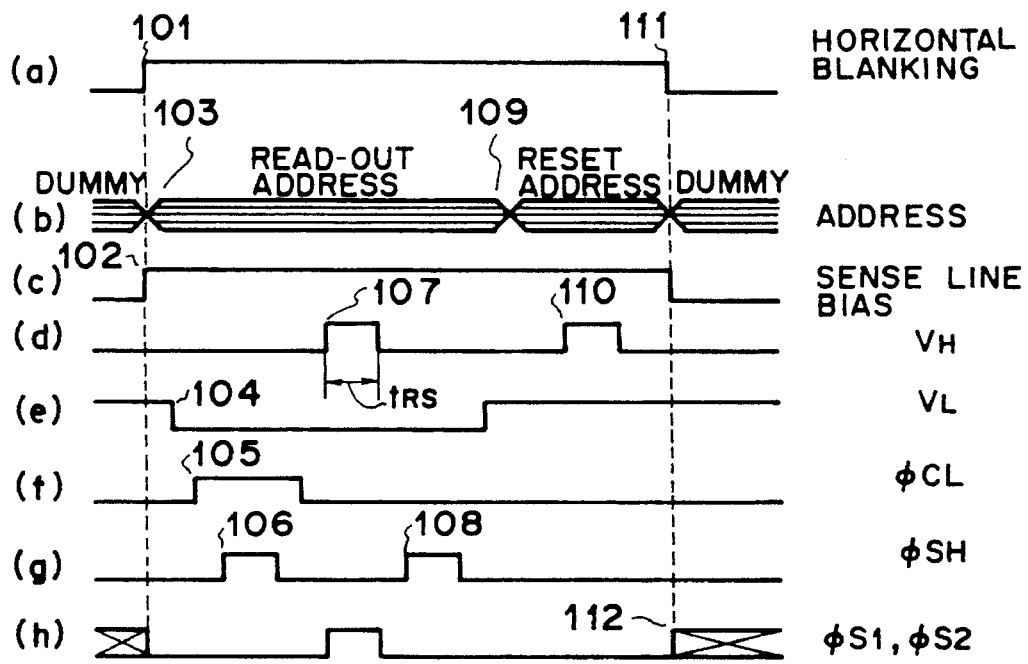
FIG. 2 is a timing chart for a conventional FGA type element.
Figure 3:
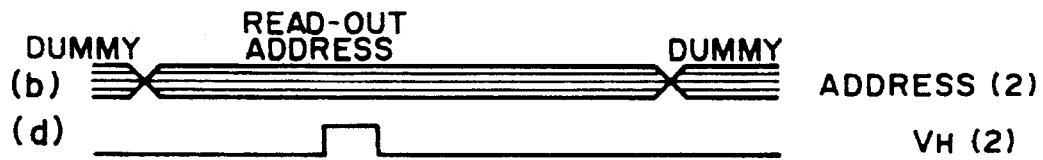
FIG. 3 is another timing chart for a conventional FGA type element.
Figure 4:
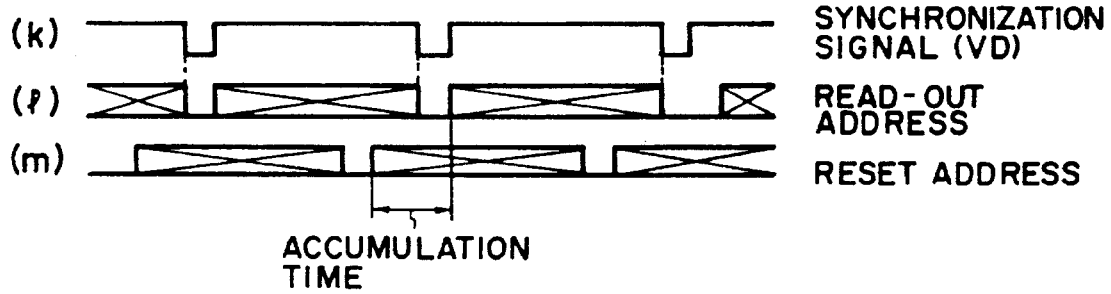
FIG. 4 illustrates the operation of a conventional electronic shutter.

The control signal circuit 7 operates such that it sets a longer width $T_{RS1}$ of the reset pulse 107a if a subject is brighter, for example, three times as longer as the conventional example shown in FIG. 2.

In this manner, a finer reset operation is possible during the low illuminance photographing. Reset fluctuation becomes therefore less conspicuous.

In this embodiment, the control circuit 7 also operates such that it automatically sets a shutter speed of an electronic shutter in accordance with an output from the illuminance detection circuit 6 or a manually set value of shutter speed setting means, and that it controls an address generator 9 in accordance with whether the electronic shutter is used or not.

According to the present embodiment, in the case where the electronic shutter is used, the pulse width $T_{RS1}$ of the reset pulse 107a is variably set within a range where it does not superpose upon the reset pulse width of the electronic shutter. In the case where the electronic shutter is not used such as during low illuminance photographing (e.g., at 1/60 sec shutter speed), the pulse width $T_{RS1}$ is made longer as shown in FIG. 6 at (d). In such a manner, reset fluctuation can be reduced.

In the above embodiment, a photometry element is used as the illuminance detection circuit 6. It is apparent that instead of using the photomerry element, the subject brightness may be detected in accordance with the brightness component of a signal outputted from the output terminal 11 of the image pickup device.

During the 1/60 second storage time, it is possible to further increase the read reset pulse width by using the reset pulse width of the electronic shutter, thereby ensuring a reliable reset operation.

Furthermore, in this embodiment, one horizontal signal train is obtained from one horizontal pixel train. Instead, one horizontal signal train may be obtained from two or more horizontal pixel trains selected at the same time (plural line simultaneous reading method). In this case, the limited horizontal blanking time can be efficiently used while providing an improved performance.

In this embodiment, an FGA type element is used. Obviously, other types of elements are also applicable.

According to the present invention, it is possible to provide a solid-state image pickup device without reset fluctuation under low illuminance.

What is claimed is:

1. A solid-state image pickup device comprising:

solid-state image pickup elements for obtaining image signals by sequentially selecting horizontal pixel trains, wherein each of said image pickup elements has a reset electrode to receive a reset pulse for clearing an accumulated signal therein;

reset pulse supply means for supplying a reset pulse having a predetermined pulse width to said reset electrode of each said image pickup element;

detecting means for detecting illuminance of an object; and reset pulse width control means for causing said reset pulse supply means to widen said reset pulse when said detecting means detects a predetermined low illuminance condition.

2. A solid-state image pickup device according to claim 1, wherein said reset pulse width control means causes said reset pulse supply means to widen said reset pulse width of a photosensitive element only during a field time period, and increases said reset pulse width.

3. An image pickup device according to claim 1, wherein said detecting means includes a photometry element.

4. A solid-state image pickup device according to claim 1, wherein said detecting means comprises a photometry element.

5. A solid-state image pickup device according to claim 1, wherein said detecting means comprises means for detecting illuminance of the object based on the image signals.

6. A solid-state image pickup device according to claim 1, wherein said detecting means comprises means for detecting illuminance of the object based on image signals generated by the photoelectric conversion of the image pickup light by said plurality of light receiving elements.

7. An image pickup device comprising:

(a) a plurality of light receiving elements for photoelectrically converting image pickup light from an object into an electrical signal and for accumulating said electrical signal;

(b) reset means for supplying a reset pulse to each of said plurality of light receiving elements to reset each of said plurality of light receiving elements;

(c) accumulation period defining means for defining an accumulation period of said electrical signal in said plurality of said light receiving elements when the luminance of said object is low; and (d) reset fluctuation removing means for causing said reset means to widen a reset pulse width of said reset pulse when the luminance of said object is low without changing said accumulation period defined by said accumulation period defining means.

8. An image pickup device according to claim 7, wherein said reset fluctuation removing means causes said reset means to widen said reset pulse width within a horizontal blanking time period of a television signal.

9. An image pickup apparatus comprising:
   (a) a plurality of light receiving elements for photoelectrically converting image pickup light from an object;
   (b) reset means for supplying a reset pulse to each of said plurality of light receiving elements to reset each of said plurality of light receiving elements;
   (c) accumulation time setting means for setting an accumulation time of said plurality of light receiving elements; and
   (d) reset fluctuation removing means for causing said reset means to widen a reset pulse width of said reset pulse when illuminance of said object is low without changing said accumulation time.

10. An image pickup apparatus according to claim 9, wherein said reset fluctuation removing means causes said reset means to widen the reset pulse width within a horizontal blanking time period of a television signal.

11. An image pickup apparatus according to claim 9, wherein said reset fluctuation removing means comprises illuminance detecting means for detecting the brightness of the object.

12. An image pickup apparatus according to claim 11, wherein said illuminance detecting means comprises a photometry element.

13. An image pickup apparatus according to claim 11, wherein said illuminance detecting means comprises means for detecting illuminance of the object based on image signals generated by the photoelectric conversion of the image pickup light by said plurality of light receiving elements.

14. An image pickup apparatus according to claim 9, wherein said plurality of light receiving elements include a plurality of phototransistors arranged in a matrix form.

15. An image pickup apparatus comprising:
   (a) a plurality of light receiving elements for photoelectrically converting image pickup light from an object;
   (b) reset means for supplying a reset pulse to each of said plurality of light receiving element to reset each of said plurality of light receiving elements;
   (c) detection means for detecting brightness of said object;
   (d) reset fluctuation removing means for causing said reset means to widen a reset pulse width of said reset pulse when the luminance of said object is low; and
   (e) accumulation time setting means for setting an accumulation time of said plurality of light receiving elements independently of said reset pulse width.

16. An image pickup apparatus according to claim 15, wherein said reset fluctuation removing means causes the reset means to widen the width of said reset pulse within a horizontal blanking time period of a television signal.

17. An image pickup apparatus according to claim 15, wherein said plurality of light receiving elements include a plurality of phototransistors arranged in a matrix form.

18. An image pickup apparatus according to claim 15, wherein said reset fluctuation removing means comprises illuminance detecting means for detecting the brightness of the object.

19. An image pickup apparatus according to claim 18, wherein said illuminance detecting means comprises a photometry element.

20. An image pickup apparatus according to claim 18, wherein said illuminance detecting means comprises means for detecting illuminance of the object based on image signals generated by the photoelectric conversion of the image pickup light by said plurality of light receiving elements.

* * * * *

UNITED STATES PATENT AND TRADEMARK OFFICE
CERTIFICATE OF CORRECTION

PATENT NO. : 5,576,762

DATED : November 16, 1996

INVENTORS : YOSHIRO UDAGAWA

It is certified that error appears in the above-identified patent and that said Letters Patent is hereby corrected as shown below:

<u>ON TITLE PAGE</u>

[63] Related U.S. Application Data

"Continuation-in-part" should read --Continuation--.

<u>COLUMN 2</u>

Line 30, "inven&on" should read --invention--;
Line 36, "sequent&ally" should read --sequentially--.

Signed and Sealed this

Twenty-ninth Day of April, 1997

Attest:

BRUCE LEHMAN

*Attesting Officer*  *Commissioner of Patents and Trademarks*